(12) United States Patent
Mattern et al.

(10) Patent No.: US 7,155,351 B2
(45) Date of Patent: Dec. 26, 2006

(54) METHOD FOR VERIFYING THE CALCULATOR CORE OF A MICROPROCESSOR OR A MICROCONTROLLER

(75) Inventors: Klaus-Peter Mattern, Beilstein (DE); Michael Hering, Leonberg (DE); Werner Harter, Illingen (DE)

(73) Assignee: Robert Bosch GmbH, Stuttgart (DE)

( * ) Notice: Subject to any disclaimer, the term of this patent is extended or adjusted under 35 U.S.C. 154(b) by 159 days.

(21) Appl. No.: 10/491,402

(22) PCT Filed: Jul. 30, 2002

(86) PCT No.: PCT/DE02/02790

§ 371 (c)(1),
(2), (4) Date: Sep. 20, 2004

(87) PCT Pub. No.: WO03/032162

PCT Pub. Date: Apr. 17, 2003

(65) Prior Publication Data

US 2005/0033533 A1    Feb. 10, 2005

(30) Foreign Application Priority Data

Sep. 28, 2001    (DE) ................ 101 48 032

(51) Int. Cl.
*G06F 19/00*    (2006.01)
(52) U.S. Cl. .............. 702/58; 702/117; 702/119; 714/25; 714/30; 714/31; 714/36; 714/733; 714/734
(58) Field of Classification Search ........... None
See application file for complete search history.

(56) References Cited

U.S. PATENT DOCUMENTS

| | | | |
|---|---|---|---|
| 5,195,095 A | | 3/1993 | Shah |
| 5,732,209 A | * | 3/1998 | Vigil et al. .......... 714/30 |
| 5,937,154 A | * | 8/1999 | Tegethoff .......... 714/30 |
| 5,963,566 A | * | 10/1999 | Rajsuman et al. .......... 714/733 |
| 5,991,898 A | * | 11/1999 | Rajski et al. .......... 714/30 |
| 6,408,413 B1 | * | 6/2002 | Whetsel .......... 714/727 |
| 6,701,476 B1 | * | 3/2004 | Pouya et al. .......... 714/727 |
| 6,728,901 B1 | * | 4/2004 | Rajski et al. .......... 714/30 |

(Continued)

FOREIGN PATENT DOCUMENTS

DE    37 37 713    5/1989

(Continued)

OTHER PUBLICATIONS

Bernardi et al., "Using Infrastructure IPs to Support SW-based Self-Test of Processor Cores", IEEE, 2004.*

(Continued)

*Primary Examiner*—Patrick J. Assouad
(74) *Attorney, Agent, or Firm*—Kenyon & Kenyon LLP (57) ABSTRACT

A method for checking a microprocessor for correct operation, the microprocessor having a plurality of gates, each having a plurality of transistors, in which during the intended running of a computer program on the microprocessor a self-test is cyclically executed, and as part of the self-test, gates in the microprocessor are checked for correct operation. In order to check the microprocessor for correct operation in such a way that the functional check is able to detect at an early stage such errors which occur only during the intended operation of the microprocessor, and to the extent possible not to make use of models of the open-loop or closed-loop control algorithms, at least those gates of the microprocessor whose state has an impact on the intended running of the computer program on the microprocessor are checked during one run of the self-test.

7 Claims, 4 Drawing Sheets

U.S. PATENT DOCUMENTS

| | | | |
|---|---|---|---|
| 6,948,096 B1* | 9/2005 | Parvathala et al. | 714/30 |
| 6,954,888 B1* | 10/2005 | Rajski et al. | 714/739 |
| 2002/0184582 A1* | 12/2002 | Pouya et al. | 714/726 |
| 2003/0131296 A1* | 7/2003 | Park et al. | 714/727 |
| 2003/0167144 A1* | 9/2003 | Wang et al. | 702/119 |
| 2004/0006729 A1* | 1/2004 | Pendurkar | 714/733 |
| 2005/0050387 A1* | 3/2005 | Mariani et al. | 714/13 |
| 2005/0060626 A1* | 3/2005 | Rajski et al. | 714/728 |
| 2006/0020411 A1* | 1/2006 | Gedamu et al. | 702/117 |
| 2006/0020442 A1* | 1/2006 | Gedamu et al. | 703/28 |
| 2006/0026478 A1* | 2/2006 | Gedamu et al. | 714/733 |
| 2006/0031789 A1* | 2/2006 | Gedamu et al. | 716/1 |

FOREIGN PATENT DOCUMENTS

| | | |
|---|---|---|
| DE | 3790186 | 12/1992 |
| DE | 4139151 | 6/1993 |
| DE | 4305288 | 8/1994 |
| DE | 19500188 | 7/1996 |

OTHER PUBLICATIONS

Kranitis et al., "Effective Software Self-Test Methodology for Processor Cores", IEEE, 2002.*

Radecka et al., "Arithmetic Built-In Self-Test for DSP Cores", IEEE, 1997.*

Krstic et al., "Embedded Software-Based Self-Test for Programmable Core-Based Designs", IEEE, 2002.*

Chen et al., "Software-Based Self-Testing Methodology for Processor Cores", IEEE, 2001.*

Chen et al., "Embedded Hardware and Software Self-Testing Methodologies for Processor Cores", IEEE, 2000.*

Kranitis et al., "Instruction-Based Self-Testing of Processor Cores", IEEE, 2002.*

Jayaraman et al., "Native Mode Functional Self-Test Generation for Systems-on-Chip", IEEE, 2002.*

Böhl, E. et al., "The Fail-Stop Controller AE 11", International Test Conference, Paper 24.1, pp. 567 to 577, 0-7803-4209-7/97, 1997 IEEE.

"Design & Elektronik Mikrocontroller und DSPs", Oct. 1999, Seite 76.

* cited by examiner

METHOD FOR VERIFYING THE CALCULATOR CORE OF A MICROPROCESSOR OR A MICROCONTROLLER

FIELD OF THE INVENTION

The present invention relates to a method for checking a core of a microprocessor or microcontroller for correct operation. Such a core has a plurality of gates, each having a plurality of transistors. In this method, a self-test is cyclically executed while a computer program is running on the microprocessor or microcontroller as intended. As part of the self-test, gates in the core are checked for correct operation.

The present invention also relates to a self-test for checking a core of a microprocessor or microcontroller for correct operation. Such a core has a plurality of gates, each having a plurality of transistors. The self-test may be executed cyclically while a computer program is running on the microprocessor or microcontroller as intended. The self-test checks gates in the core for correct operation.

Finally, the present invention relates to a microprocessor or microcontroller with a core having a plurality of gates, each having a plurality of transistors. A self-test can be carried out on the core to check it for correct operation. The self-test can be carried out cyclically while a computer program is running on the microprocessor or microcontroller as intended. In this process, the self-test checks the gates of the core for correct operation.

BACKGROUND INFORMATION

The self-test of a core is also referred to as a "built-in self-test" (BIST). Various self-test processes are known, for example from German Patent Application No. DE 43 05 288 and the article "The Fail-Stop Controller AE 11" by Böhl, E. et al., International Test Conference, Paper 24.1, pp. 567 to 577, 0-7803-4209-7/97, 1997 IEEE. Reference is made explicitly to these publications.

The concept "intended running of a computer program on the microprocessor or microcontroller" means that, for example, a control program is run on a microprocessor or microcontroller of a controller, without which the microprocessor or the controller is unable to carry out its control functions. The core of a microprocessor or microcontroller is also referred to as the central processing unit (CPU).

In the field of motor vehicle controllers it is known, for checking the operation of a core during the intended operation of the controller, to provide two computers of equal computing power. This is also described as the redundant computer concept. The open-loop or closed-loop control algorithm runs on both computers. The results of the open-loop or closed-loop control algorithms of the two computers are constantly compared. If there are significant discrepancies between the two sets of results, it is assumed that there is an error in one of the two computers and the whole system is shut down in order to prevent the issuing of erroneous open-loop or closed-loop instructions.

However, a disadvantage of this method for checking the correct operation of a microprocessor or microcontroller core, known from the related art, is that errors which occur only during the intended operation of the controller, i.e., during the processing of an open-loop or closed-loop control program, results in shutdown of the controller at a moment when its open-loop or closed-loop control function is particularly important. For example, in the case of a stability control system, the control function becomes active when the vehicle is in danger of swerving. If an error in the controller core is detected in such a situation and the controller is shut down, this may result in dangerous situations, including, at worst, the vehicle swerving.

In order to counter such disadvantages, a diversitary computer concept has been developed and is known, for example, from German Patent Application No. DE 195 00 188, in which the first computer, known as the algorithm computer, has greater processing power than the second one, known as the monitor computer. The actual open-loop or closed-loop control algorithm, as well as a check computation, runs on the algorithm computer. The check computation is carried out on the same microprocessor or microcontroller as the open-loop or closed-loop control algorithm but in different time segments. Each time the check computation is called up, a certain area, i.e., certain gates, of the core are checked for correct operation. By means of the check computation, errors in the algorithm computer's core can be detected even if this computer is not being operated as intended, in other words if no open-loop or closed-loop control program is being processed. The check computation may be described as a type of self-test.

The same check computation runs on the monitor computer. The results of the check computations are compared, and in the event of significant discrepancies, it is assumed that there is an error in the algorithm computer's core, which is then shut down in order to avoid erroneous open-loop or closed-loop control. The check computation makes it possible to check between 80% and 85% of all the gates in the algorithm computer's core. The remaining 15% to 20% of the gates in the algorithm computer's core still have to be checked by modeling the open-loop or closed-loop control algorithm on the monitor computer and by comparing the modeled results with the actual results from the algorithm computer, thereby checking for correct operation. For these 15% to 20% of the gates in the core, the problem described above still exists, namely that errors do not occur and cannot be detected until a moment when the algorithm is being operated as intended, or in other words, for example, when an open-loop or closed-loop control program is being processed. In addition, modeling of the open-loop or closed-loop control algorithm in the monitor computer means that if there is a change in the open-loop or closed-loop control algorithm, the model also has to be changed. Consequently, two groups of developers are constantly busy developing not only the actual open-loop or closed-loop control algorithm but also the model. This results in a considerable manpower and monetary expenditure.

SUMMARY OF THE INVENTION

An object of the present invention is to check a microprocessor or microcontroller core for correct operation in such a manner that the disadvantages described above are avoided. In particular, it is intended that the functional check shall be able to detect at an early stage such errors which occur only during the intended operation of the microprocessor or microcontroller, and to the extent possible not to make use of models of the open-loop or closed-loop control algorithms.

In order to achieve this object it is provided according to the present invention that at least those gates in the core whose state has an impact on the intended running of a computer program on the microprocessor or microcontroller will be checked during one run of the self-test.

According to the present invention it has been recognized that a core contains some gates whose state has no impact on the intended running of a computer program on the microprocessor or microcontroller. Errors in these gates, such as a "stuck at 0" or "stuck at 1," thus have no impact on the running of the computer program and thus on the correct operation of the microprocessor or microcontroller. It has further been recognized that such gates do not need to be checked by a self-test in order to ensure correct operation of the microprocessor.

It is important for the present invention first to determine all gates which are not covered by the self-test and to verify that the state of these gates is not relevant, in other words it has no impact on the intended running of a computer program on the microprocessor or microcontroller. The aim of the present invention is not to achieve complete test coverage of all gates in the core, but to check all relevant gates. With the present invention it is not necessary to model the computer program, for example open-loop or closed-loop control algorithms, to check the gates not covered by the self-test, since these gates in any event do not have any impact on the intended running of the computer program.

In an advantageous embodiment of the present invention it is provided that the self-test should be created by means of the following steps:

a tentative version of a self-test for the core is created;

a check is carried out on whether the state of those gates in the core which are not checked by the tentative version of the self-test during one run has any impact on the intended running of the computer program on the microprocessor or microcontroller;

if the state of at least one gate in the core that is not checked by the tentative version of the self-test during one run has an impact on the intended running of the computer program on the microprocessor or microcontroller, the final version of the self-test is created by expanding the tentative version of the self-test in such a way that additionally there is a check on at least those gates in the core which were not checked by the tentative version of the self-test and whose state has an impact on the intended running of the computer program on the microprocessor or microcontroller; and if the state of those gates of the core which are not checked by the tentative version of the self-test during one run has no impact on the intended running of the computer program on the microprocessor or microcontroller, the tentative version of the self-test is applied as the final version.

According to a preferred embodiment of the present invention it is provided that, before the check on whether the state of those gates of the core which are not checked by the tentative version of the self-test during one run has an impact on the intended running of the computer program on the microprocessor or microcontroller, it is determined which gates of the core are not checked by the tentative version of the self-test during one run.

It is advantageous if the determination of which gates of the core are not checked by the tentative version of the self-test during one run is carried out on an emulator on which the gate structure of the core is mapped, at least partially.

It is preferable if the check on whether the state of those gates of the core which are not checked by the tentative version of the self-test during one run has an impact on the intended running of the computer program on the microprocessor or microcontroller is carried out on an emulator on which the gate structure of the core is mapped, at least partially.

As a further approach to achieve the object of the present invention, it is provided, based on the self-test of the type described above, that the self-test should check during one run at least those gates of the core whose state has an impact on the intended running of the computer program on the microprocessor or microcontroller.

As a further approach to achieve the object of the present invention, it is provided, based on the microprocessor or microcontroller of the type described provided, that the self-test contained on the microprocessor or microcontroller should check during one run at least those gates in the core whose state has an impact on the intended running of the computer program on the microprocessor or microcontroller.

DETAILED DESCRIPTION

Figure 4:
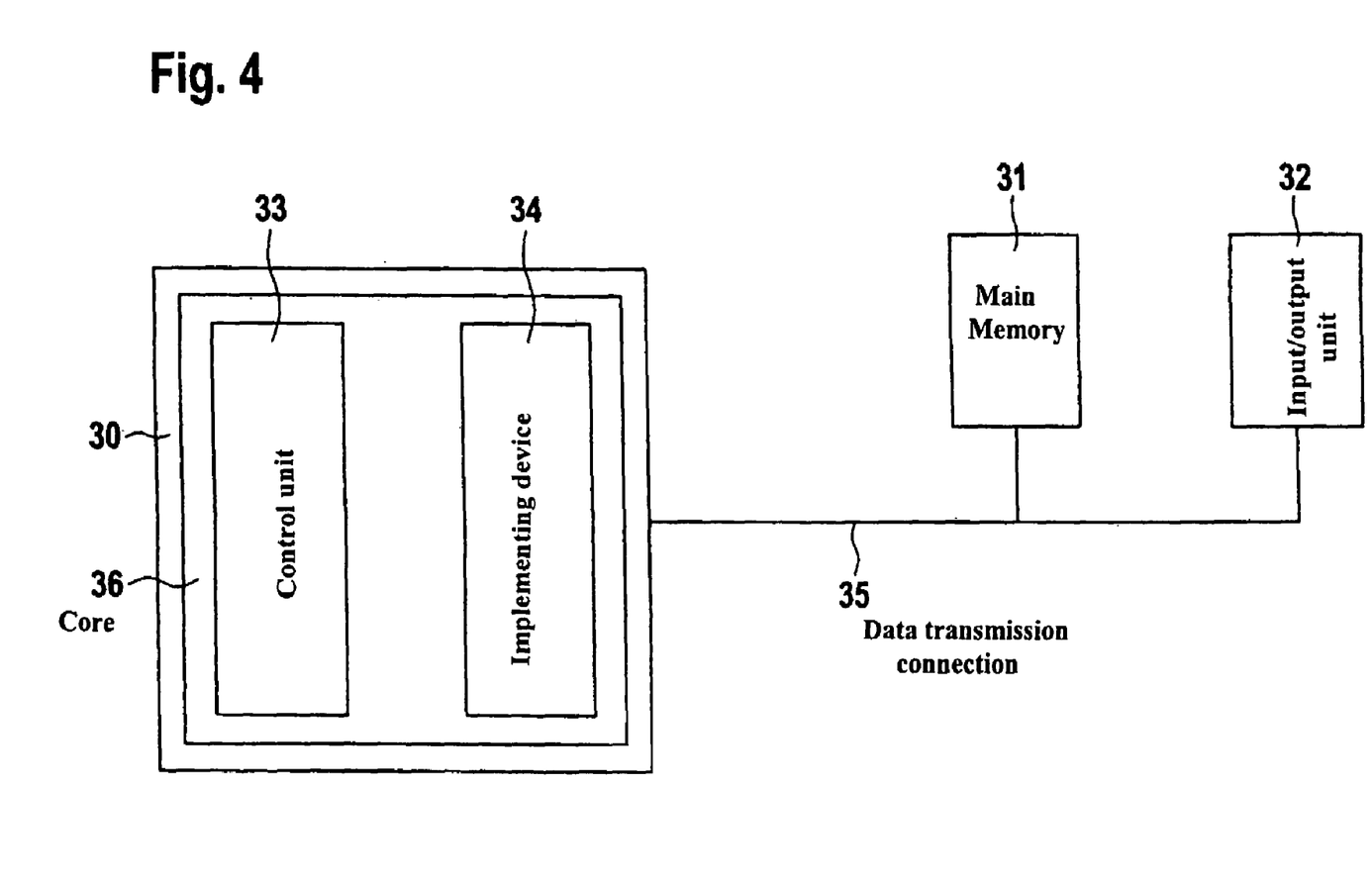
FIG. 4 shows a microprocessor according to the present invention.

In FIG. 4, number 30 refers to a microprocessor according to the present invention, in its entirety. Microprocessor 30 is linked to a main memory 31 and an input/output unit 32 via a suitable data transmission connection 35. Main memory 31 is used to store operands and computer programs. Data from peripheral devices is read in from and output to peripheral devices via input/output unit 32.

Microprocessor 30 has a core 36, also referred to as a central processing unit (CPU). Microprocessor 30 includes a control unit 33 and an implementing device 34. Control unit 33 handles the sequence control within processor 30 and the activation of main memory 31 and input/output unit 32. It triggers the reading of instructions in the computer program from main memory 31, interprets them and controls their implementation. The operands to be processed are read out of main memory 31 or input via input/output unit 32 into implementing device 34 and the results are written into main memory 31 or output via input/output unit 32. Implementing device 34 handles the temporary storage of the operands and the results and carries out the logical and arithmetic operations with these operands.

In addition to external main memory 31, microprocessor 30 itself has a number of memory locations. Some of them are allocated to specific processes within processor 30 and are not directly available for machine language programming or Assembler programming. Others can be explicitly selected as memory cells of main memory 31 and are thus "visible" to the programmer.

The circuitry of core 36 is made up primarily of a large number of transistors (not shown). Several transistors can be grouped together to form gates. The outputs of the gates are described as nodes. A node can be described as a point in the circuitry of the core having an unambiguous behavior at any time. A core has, for example, about 100,000 gates each with about 10 to 100 transistors.

A microcontroller on which the method according to the present invention may also be carried out is known from the article "The Fail-Stop Controller AE11" by Böhl, E. et al., International Test Conference, Paper 24.1, pp. 567 to 577, 0-7803-4209-7/97, 1997 IEEE. Reference is made explicitly to this publication.

Figure 2:
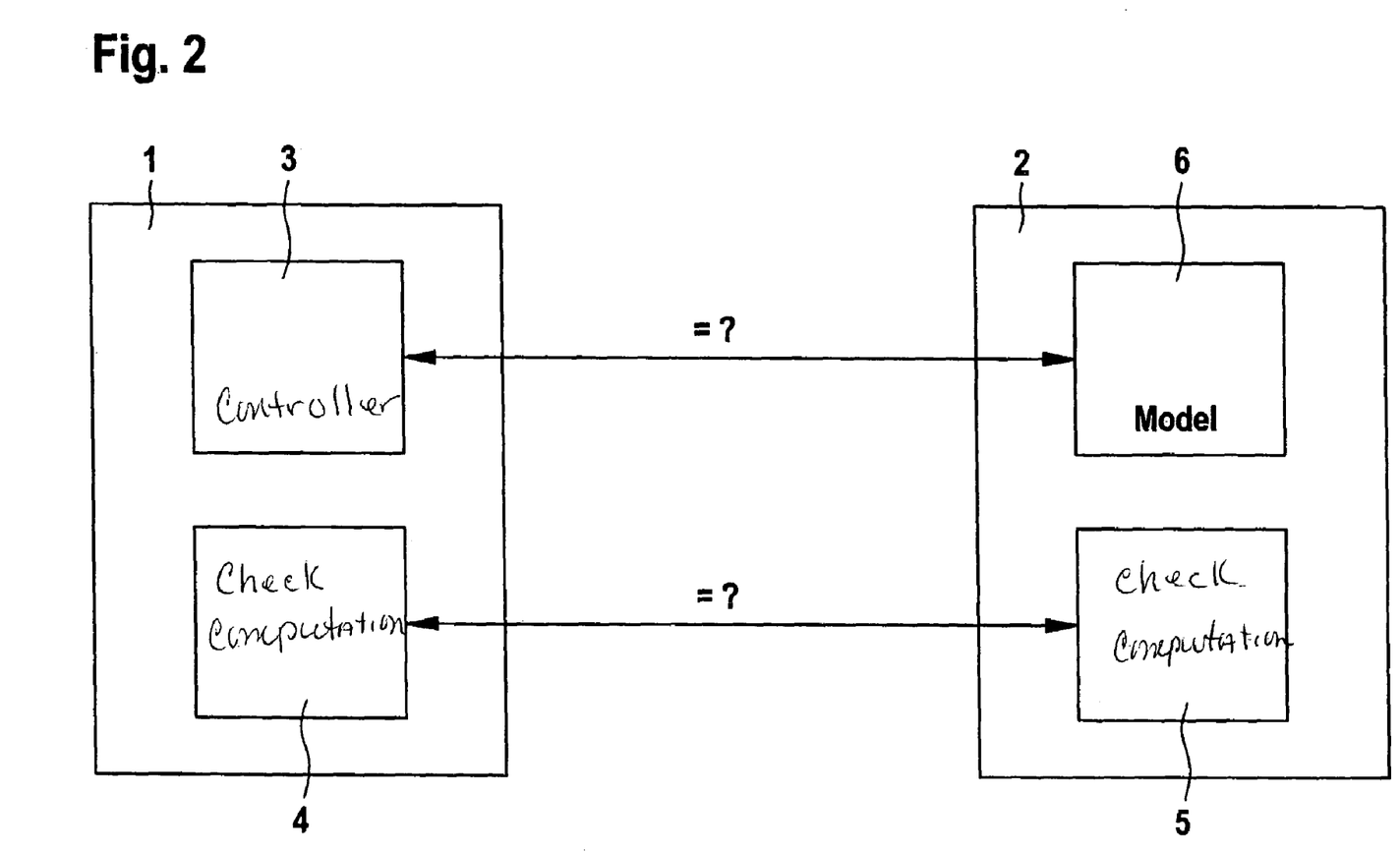
FIG. 2 shows a diversitary computer concept for carrying out a method, known from the related art, for checking a microprocessor for correct operation.

FIG. 2 shows a diversitary computer concept, as known, for example, from German Patent Application No. DE 195 00 188. Reference is made explicitly to this publication. This computer concept is used to carry out a method, known from the related art, for checking core 36 of a microcontroller 30 for correct operation.

In the diversitary computer concept two computers are utilized. A first one, known as algorithm computer 1, is more powerful than the second, known as monitor computer 2. A computer program with the actual open-loop or closed-loop control algorithm 3 runs on algorithm computer 1. In addition, a check computation 4 is carried out on algorithm computer 1. In check computation 4, test programs are processed to a limited extent by microprocessor 30 and output signals are picked up and analyzed via output unit 32. Check computation 4, implemented in software form as part of the computer program, is processed on-line by algorithm computer 1 in time segments simultaneously with the actual open-loop or closed-loop control algorithm 3. Each time check computation 4 is called up in a time segment, a certain area, i.e., certain gates, of core 36 is/are checked for correct operation. In order to run through a complete run of check computation 4, the latter is called up in several time segments. After one run of the check computation, not all gates of core 36 will have been checked. Normally, the check computation tests about 80% to 85% of all the gates in core 36 of algorithm computer 1.

A check computation (CR) 5 is also carried out on monitor computer 2. In this process, correct operation of the gates in a core 36 of monitor computer 2 is checked. The results of check computation 4 executed on algorithm computer 1 and check computation 5 executed on monitor computer 2 are compared. If there are significant discrepancies, it is assumed that there is an error in core 36 of algorithm computer 1, and it is shut down to prevent erroneous open-loop or closed-loop control.

Using the check computation it is also possible to detect errors in core 36 of algorithm computer 1 even when the latter computer is not being operated as intended, in other words when no open-loop or closed-loop program is being processed. The check computation may be referred to as a type of self-test.

The remaining 15% to 20% of the gates in core 36 of algorithm computer 1, which are not covered by the check computation, must be checked for correct operation through modeling 6 of a computer program, for example open-loop or closed-loop control algorithm 3 on monitor computer 2, and comparison of the modeled results from monitor computer 2 with the actual results from algorithm computer 1. On monitor computer 2 the open-loop or closed-loop control algorithm 3 is mapped in a model 6. The results of the actual open-loop or closed-loop control algorithm 3 and of the modeled open-loop or closed-loop control algorithm 6 are compared. If there are significant discrepancies, it is assumed that there is an error in core 36 of algorithm computer 1, which is then shut down. Admittedly, this approach does not make it possible to carry out a check for errors on the gates of microprocessor 30 not covered by the check computation. For these 15% to 20% of the gates of microprocessor 30 of algorithm computer 1 there is, however, the problem that errors do not occur and cannot be detected until microprocessor 30 is operated as intended, i.e., during processing of an open-loop or closed-loop control program. In addition, modeling 6 of the open-loop or closed-loop control algorithm in monitor computer 2 means that if the open-loop or closed-loop control algorithm 3 is modified, model 6 must also be modified.

Figure 1:
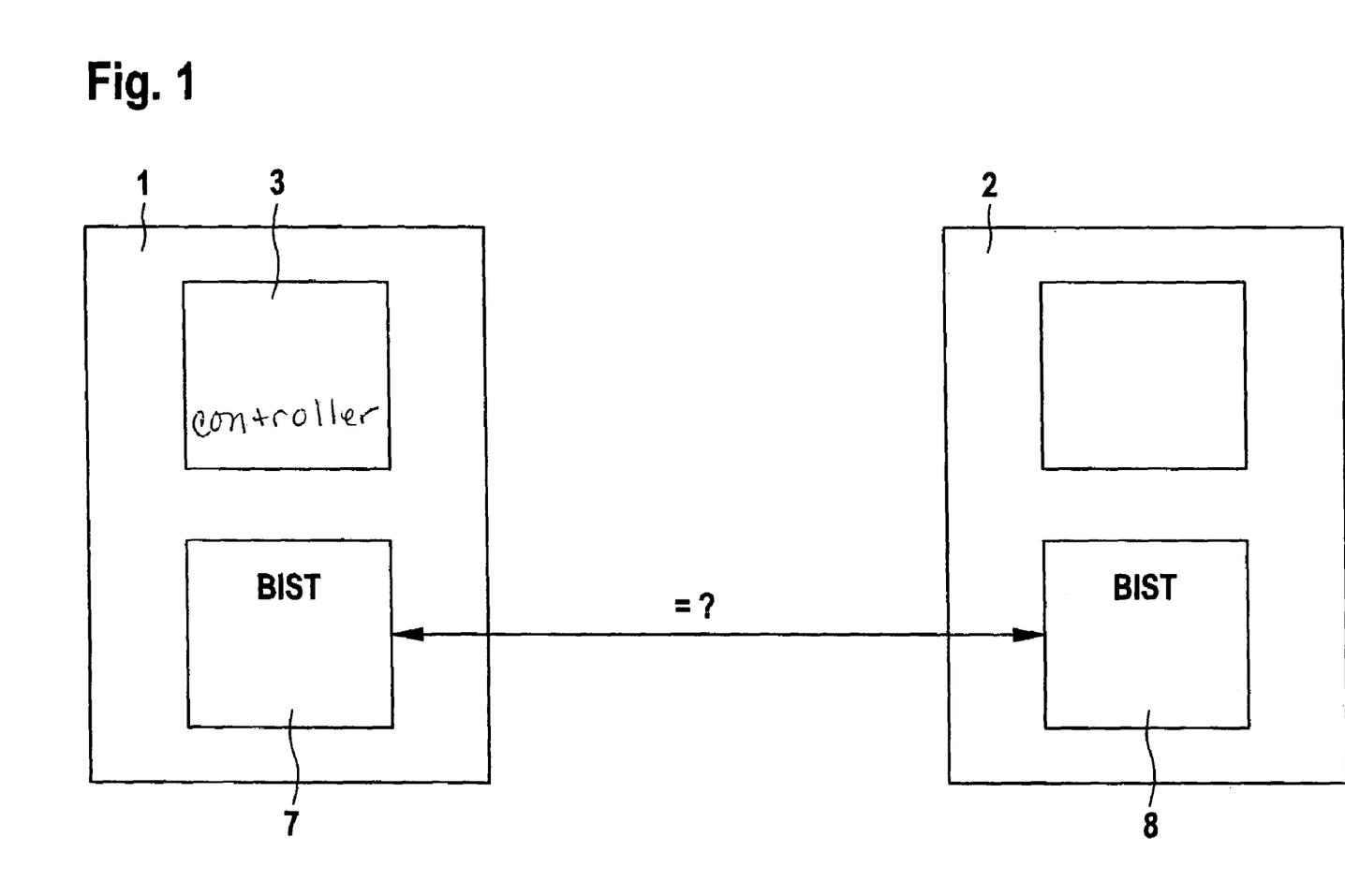
FIG. 1 shows a diversitary computer concept to carry out a method according to the present invention for checking a microprocessor for correct operation.

According to the present invention, therefore, the diversitary computer concept shown in FIG. 1 is provided, in which the known check computation is expanded to a complete self-test 7, 8, known as a Built-In Self-Test (BIST). BIST 7 may be based on the test vectors used by a semiconductor manufacturer in the course of producing core 36. In BIST 7 test programs are processed by algorithm computer 1 and the generated results (signatures) are picked up as output signals at outputs of microprocessor 30 and analyzed.

In order to analyze the test results, they are provided to monitor computer 2 via a serial data interface. There, the test results of BIST 7 from algorithm computer 1 and of BIST 8 from monitor computer 2 are compared. If an error is detected, a safety shutdown is performed on algorithm computer 1 until the next hardware reset. In place of a separate monitor computer 2 the second independent computing component could also be integrated with algorithm computer 1 as an application-specific integrated circuit (ASIC) on a shared hardware subassembly.

BIST 7 implemented in software form as part of the computer program running on microprocessor 30 is processed on-line by algorithm computer 1 in time segments simultaneously with the execution of the actual open-loop or closed-loop control algorithm 3. Each time that BIST 7 is called up in a time segment, a certain area, i.e., certain gates of core 36 is/are checked for correct operation. For a run through BIST 7, therefore, the latter has to be called up several times. A BIST 7 run takes approximately a few milliseconds (e.g., 3 ms). One BIST run tests approximately 90% to 95% of all gates in core 36 of algorithm computer 1.

With regard to the remaining 5% to 10% of the gates which are not covered by the BIST, it can be verified by simulation that the state of these gates has no impact on the running of a given computer program, in particular of an open-loop or closed-loop control algorithm, on microprocessor 30 as intended. To ensure correct operation of these 5% to 10% of the gates, therefore, it is not necessary—as it is in the related art—to use a model 6 of the computer program. Using the method according to the present invention, it is possible to perform an application-independent check of the operation of microprocessor 30 and at the same time a complete check of all relevant gates of core 36.

In order to implement the method according to the present invention, it must first be determined which gates of core 36 of algorithm computer 1 are checked for correct operation by BIST 7 and which gates are not covered by BIST 7. For those gates that are not covered by BIST 7, it must then be determined for a given computer program running on microprocessor 30 whether the state of those gates has any impact on the intended running of the computer program.

Both items of information may be ascertained by using a simulation computer known as a silicon emulator. On the silicon emulator the gate structure of core 36 is mapped in field programmable gate arrays FPGA. The silicon emulator is programmed using netlists which come from the manufacturer of core 36 and describe the behavior of core 36. The gate arrays are located in an emulation box which is controlled or operated from a computer, in particular a workstation. The emulation box and the workstation constitute the silicon emulator.

The effectiveness of the BIST is demonstrated by an error simulation process. The simulation supplies a distinctive number for the degree of error coverage, expressed in percentage terms. In the error simulation process, in order to test the instructions, the instruction test program is run on the silicon emulator using an error-free and an error-loaded model of core 36 of algorithm computer 1. If the instruction test program detects a discrepancy, an error is recognized. The entirety of all instruction test programs makes up BIST 7 of core 36. Each individual error not discovered by the BIST subsequently becomes an input variable in the error emulation to be run in the following step.

The error emulation is carried out on the silicon emulator's gate model to determine the impact of the state of a gate on the intended running of the computer program. The fact that the error emulator works together with the peripheral equipment of algorithm computer 1 permits the impacts of errors not detected by the BIST on the system as a whole to be determined.

If in the course of the error simulation and error emulation a gate in core 36 of the algorithm computer 1 is discovered which is not covered by the BIST but has an impact on the intended running of the computer program, the BIST can be expanded or modified accordingly such that this gate will also be covered by the BIST. BIST 7 is thus expanded in an iterative process to the degree that all critical residual errors are recognized and system security is thereby guaranteed.

Figure 3:
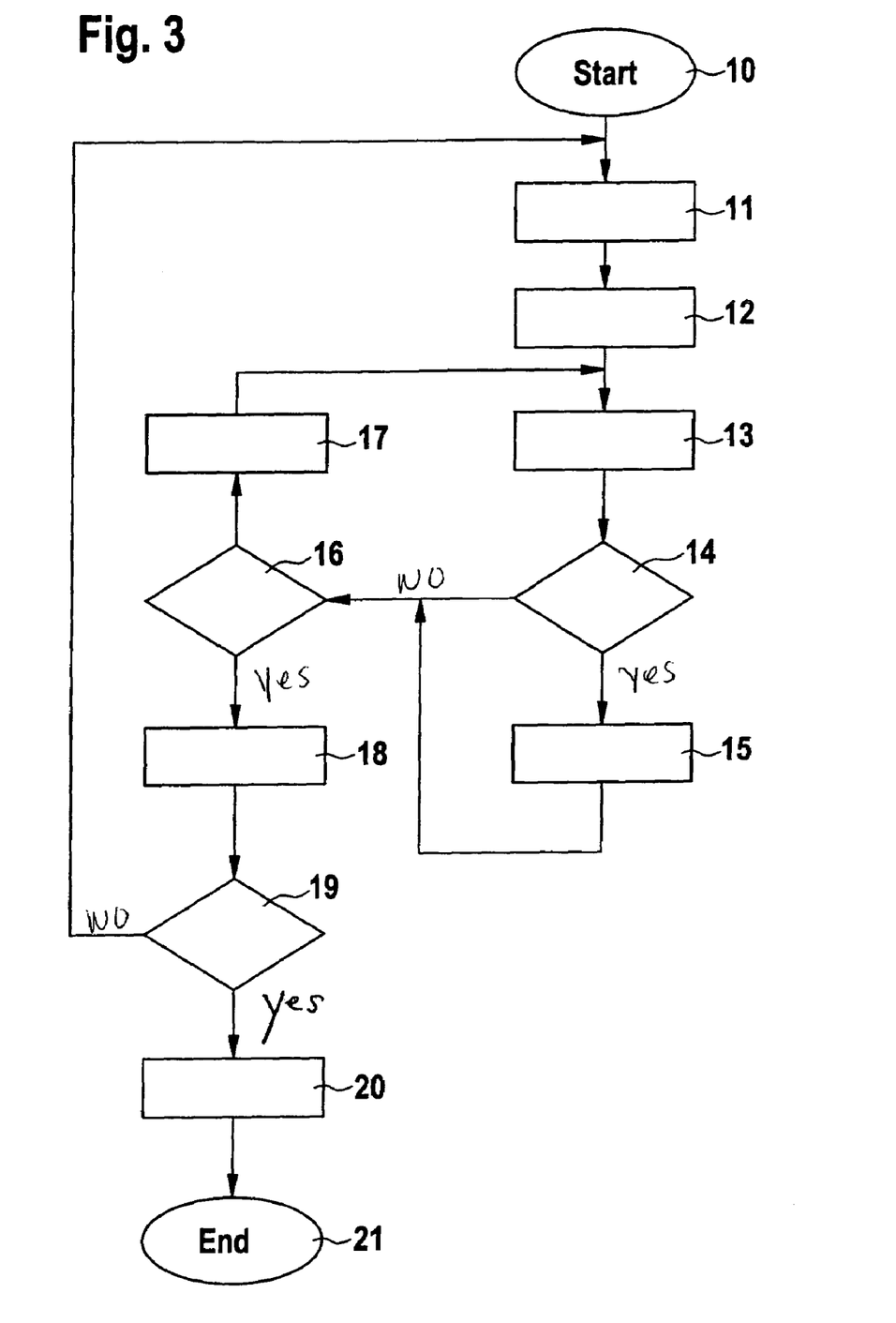
FIG. 3 shows a flow chart of the method according to the present invention.

FIG. 3 shows a flow chart of a method according to the present invention. The method begins in a functional block 10. In a functional block 11 a tentative version of a BIST is created for core 36 of algorithm computer 1. This tentative version may be created independently of a computer program, e.g., using an open-loop or closed-loop control algorithm, which is intended to be run subsequently on microprocessor 30. It is also conceivable, however, that the tentative version of the BIST has already taken into account the computer program which is intended to be run subsequently on microprocessor 30. The tentative version is generally created by the manufacturer of core 36.

The error simulation is carried out in a functional block 12 to determine the effectiveness of the tentative version for the tentative version of the BIST, in other words, to determine which gates are not checked by the tentative version. The error emulation is then carried out in a functional block 13. Both the error simulation and the error emulation are carried out in the silicon emulator at the premises of the creator of the computer program which is to be run on microprocessor 30. Error emulation determines for each gate that is not checked by the tentative version of the BIST during one run whether the state of the gate has an impact on the intended running of the computer program on microprocessor 30. If this is the case, the process branches off from an interrogation block 14 to a functional block 15, where the identification of the current gate is stored in an error memory. If, however, the state of the gate currently being examined has no impact on the running of the computer program, the process branches off to a further interrogation block 16, which examines whether all gates which are not covered by the tentative version of the BIST have been checked. If this is not the case, the process branches off to a functional block 17, where the next gate is selected as the current gate. The process also branches off from functional block 15 to interrogation block 16.

If all gates which are not covered by the tentative version of the BIST have been checked, the process branches off to functional block 18 where the error memory is read out. Interrogation block 19 checks whether the error memory is empty. If this is case, the process branches off to a functional block 20 where the current tentative version of the BIST is applied as the final BIST 7. The process according to the present invention is then terminated in a functional block 21.

If, however, the state of at least one gate of core 36, which has not been checked by the tentative version of the BIST during the run, has an impact on the intended running of the computer program on microprocessor 30 (error memory not empty) the process branches off from interrogation block 19 to functional block 11, where once again a tentative version of a BIST is created, taking into account the content of the error memory.

This recursive process is continued until the condition in interrogation block 19 (error memory empty?) is fulfilled. According to the present invention, therefore, an optimum BIST for the computer program in question is determined in a recursive process.

What is claimed is:

1. A method for checking a core of one of a microprocessor and a microcontroller for correct operation, the core including a plurality of gates each having a plurality of transistors, the method comprising:
   during an intended running of a computer program on the one of the microprocessor and the microcontroller, running a self-test cyclically and within the self-test checking the gates in the core for correct operation; and
   checking, during one run of the self-test, at least those gates in the core whose state has an impact on the intended running of the computer program on the one of the microprocessor and the microcontroller.

2. The method according to claim 1, further comprising creating the self-test via the following steps:
   creating a tentative version of a self-test for the core;
   carrying out a check on whether a state of those gates in the core which are not checked by the tentative version of the self-test during one run has any impact on the intended running of the computer program on the one of the microprocessor and the microcontroller;
   if the state of at least one of the gates in the core that is not checked by the tentative version of the self-test during one run has an impact on the intended running of the computer program on the one of the microprocessor and the microcontroller, creating a final version of the self-test in such a way that additionally there is a check on at least those gates in the core which were not checked by the tentative version of the self-test and whose state has an impact on the intended running of the computer program on the one of the microprocessor and the microcontroller; and
   if the state of those gates of the core which are not checked by the tentative version of the self-test during one run has no impact on the intended running of the computer program of the one of the microprocessor and the microcontroller, utilizing the tentative version of the self-test as the final version.

3. The method according to claim 2, further comprising, before checking whether the state of those gates in the core, which are not checked by the tentative version of the self-test during one run, has an impact on the intended running of the computer program on the one of the microprocessor and the microcontroller, determining which gates in the core are not checked by the tentative version of the self-test during one run.

4. The method according to claim 3, further comprising carrying out a determination of which gates of the core are not checked by the tentative version of the self-test during one run on an emulator on which a gate structure of the core is mapped, at least partially.

5. The method according to claim 2, wherein the check on whether the state of those gates of the core, which are not checked by the tentative version of the self-test during one run, has an impact on the intended running of the computer program on the one of the microprocessor and the microcontroller is carried out on an emulator on which a gate structure of the core is mapped, at least partially.

6. A self-test method for checking a core of one of a microprocessor and a microcontroller for correct operation, the core including a plurality of gates, each of the gates including a plurality of transistors, the method comprising:
cyclically executing a self-test while a computer program is running on the one of the microprocessor and the microcontroller as intended, the self-test including:
checking gates in the core for correct operation, and
checking during one run at least those gates in the core whose state has an impact on the intended running of the computer program on the one of the microprocessor and the microcontroller.

7. A microprocessor/microcontroller comprising:
a core including a plurality of gates, each of the gates having a plurality of transistors; and
means for executing a self-test to check the core for correct operation, the self-test being cyclically executed while a computer program is running on the microprocessor/microcontroller as intended, the self-test checking gates of the core for correct operation, the self-test further checking in one run at least those gates in the core whose state has an impact on the intended running of the computer program on the microprocessor/microcontroller.

* * * * *